Oct. 18, 1927.
C. W. HEASLEY
CUFF LINK
Filed April 5, 1927
1,645,907
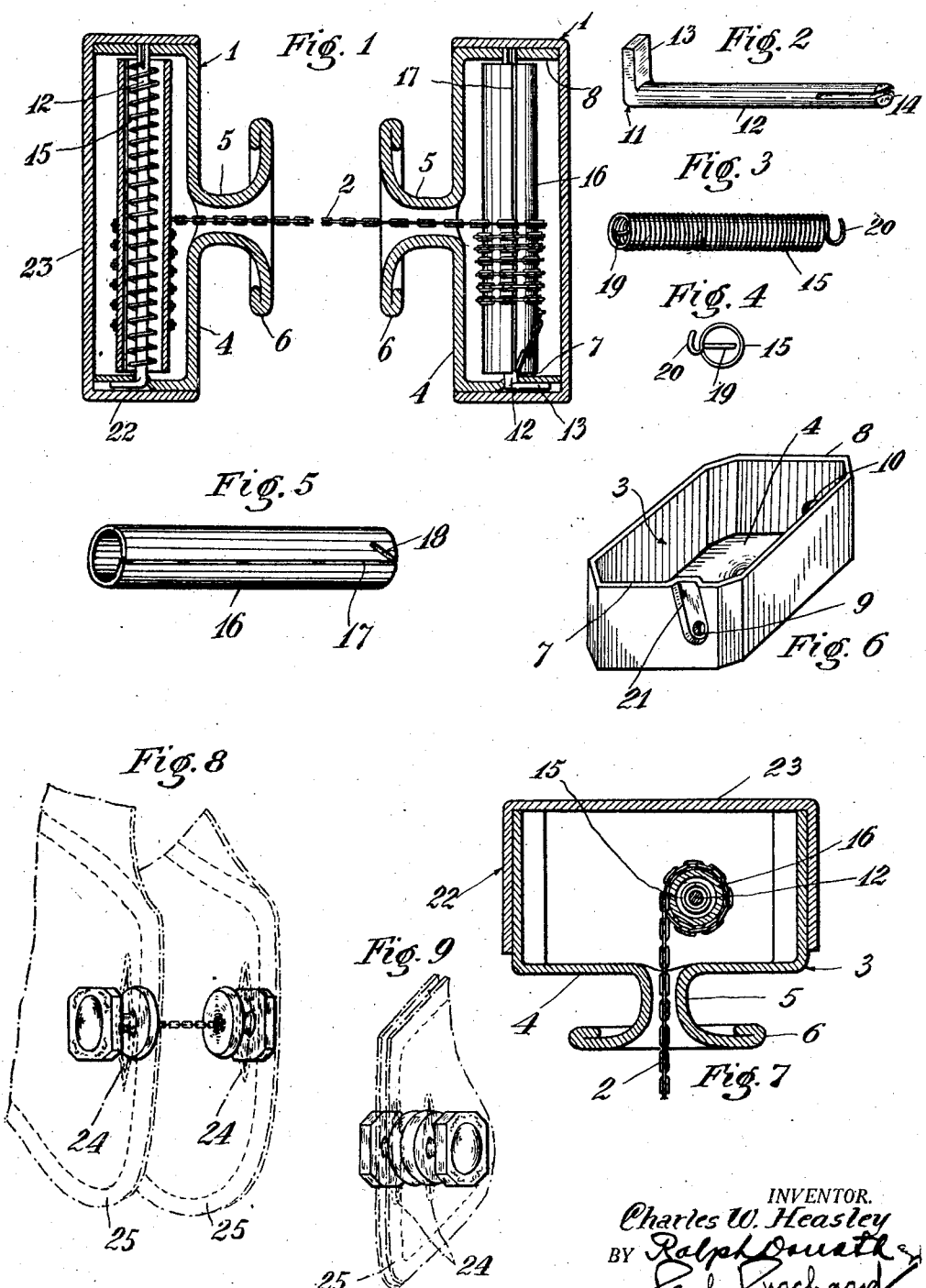
INVENTOR.
Charles W. Heasley
BY Ralph Smith
Paul Richard
ATTORNEYS Patented Oct. 18, 1927.

1,645,907

UNITED STATES PATENT OFFICE.

CHARLES W. HEASLEY, OF PITTSBURGH, PENNSYLVANIA.

CUFF LINK.

Application filed April 5, 1927. Serial No. 181,049.

This invention relates to cuff-links and more in particular to expansible, self-adjusting cuff-links.

One of the main objects of this invention is to provide a cuff-link which exerts a constant yielding pressure on both flaps of a sleeve-cuff, whereby said cuff may be closed or expanded without requiring any adjustment or manipulation on the link. Another object of this invention is to provide an expansible cuff-link the tension in which may be adjusted and maintained, to suit the requirement of the user. A further object of this invention is the provision of a cuff-link having a flexible connecting member, such as a chain, which may be easily replaced when worn out, without having to discard the other component parts of the link. Still another object is to provide a cuff-link which is simple in construction, easy in its application, efficient, ornamental and durable. Additional features and advantages of this invention will appear from the following description considered in connection with the accompanying drawing forming a part of this application, and in which:

Fig. 1 is a general view of my cuff-link, when expanded.

Fig. 2 is a perspective view of an axle used in the cuff-link.

Fig. 3 is a perspective view of the tension coil-spring.

Fig. 4 is an end view of Fig. 3.

Fig. 5 is a perspective view of the roller.

Fig. 6 is a perspective view of the box-member of a cuff-button.

Fig. 7 shows a cross-section taken through one of the cuff-buttons.

Figs. 8 and 9 are perspective views showing respectively my cuff-link as it appears on a cuff in expanded and closed position.

Reference being had to the drawing, an expansible cuff-link built in accordance with my invention consists, in the main, of two cuff-buttons 1 which are united together by means of a flexible member, such as the chain 2, the exposed length of which is automatically varied in a manner to be explained hereafter.

Each cuff-button consists of a box-member 3 in the bottom 4 of which is centrally disposed a hollow stud 5 provided with an outward flange 6. In the end walls 7 and 8 of the box-member are provided the apertures 9 and 10 in which is rotatably mounted an axle 11, the construction of which, as shown in Fig. 2, comprises a shank 12 having at one end the angularly disposed locking-arm 13 and at the other end a diametral slot 14 of suitable length. Surrounding the shank is a coil-spring 15 which in turn is encased in the hollow roller 16. The latter is preferably made from a flat strip of metal bent into a cylinder in such a manner as to provide a longitudinal slot 17. At one end of said roller is also cut at an angle the notch 18.

The coil-spring has at one end the inwardly directed extension 19 which engages the slot 14 of the axle 12, while at the other end of the spring there is formed the outwardly directed hook 20 which is properly shaped to fit within the notch 18.

The connecting chain 2 is attached to both cuff-buttons by passing the ends of the former through the hollow studs of their corresponding buttons and then hooking the last links of said chain-ends to the protruding portions of the hooks 20. However, if desired, the chain may also be connected to the rollers by inserting the last but one link at each end of the chain flat-wise into the longitudinal slot 17, the chain being, of course, prevented from pulling out by the last link which is disposed substantially at right angles to said longitudinal slot.

The desired tension in the chain is obtained by turning the axle 12 in the proper direction to wind up the coil-spring 15, and said tension is maintained by pushing the lock-arm 13 into a recess 21 suitably located in the end wall 7 of the box-member. The latter is closed by means of a cover or cap 22 the sides of which fit snugly over the box-member and whereby the lock-arm is held securely in its recess. The top 23 of said cap may be ornamented in various manners to suit the requirements of the trade.

The different parts of the cuff-link are assembled as follows: The coil-springs 15 are inserted in the rollers 16 with the hooks 20 engaging the slots 18 and said assembled parts are placed in their respective box-members. Next, both ends of the connecting chain are passed through the hollow-studs 5 and secured to the rollers in the manner above described. Each axle is then inserted successively through the aperture 9, the coil-spring 15 and the other aperture 10, due care being taken that the spring extension 19 be engaged by the slot 14 in the axle. The tension is now adjusted and the assembly completed by putting the caps 22 in place.

The application of my cuff-link is illustrated in Figs. 8 and 9 and consists simply in passing the box-members of the buttons through the corresponding button-holes 24 of the cuff 25, as will be readily understood.

In practice I prefer to provide both link-buttons with the chain winding mechanism described hereinbefore, because by this arrangement each roller will have to take care of only one half of the total expansion, thus reducing accordingly the work imposed on each coil-spring.

If desired, the cost of my cuff-link may be reduced by concentrating the total expansion on but one button, the other button being of ordinary construction, i. e. without the roller mechanism.

Although in the above description the use of my invention has been restricted to cuff-links, it will be understood that the invention is equally applicable for other uses such as for instance in connection with wearing apparel connectors, shoe lacing devices, hat-strings, etc.

While I have illustrated and described herein the preferred embodiment of my invention, and one which I have found by actual construction and use to be very practical, it may be thought desirable after continued experience to make slight changes in the construction and arrangement of the details of my invention, and I intend to include in this application all such variations as fall within the scope of the appended claims.

I claim:

1. In a cuff-link, a pair of cuff-buttons; a flexible member for connecting same, and winding means positioned diametrally in each button for varying the effective length of said flexible member; said winding means comprising an axle rotatably mounted in said button; a roller member surrounding said axle and a coil-spring positioned between said axle and roller; means for securing one end of said spring to said axle and the other end to said roller, and means for securing said flexible member to the roller.

2. In a cuff-link, a pair of cuff-buttons; a flexible member for connecting same, and winding means positioned diametrally in each button for varying the effective length of said flexible member; said winding means comprising a rotatable axle having a slot at one end thereof; a roller surrounding said axle and having a notch cut therein; a coil-spring placed intermediate said axle and roller; extensions positioned at both ends of the spring adapted respectively to engage said slot and notch, and holding means positioned on said axle for rotating same for the purpose of adjusting the tension in said coil-spring, and means for securing said flexible member to said roller.

3. In a cuff-link, a pair of cuff-buttons; a flexible member for connecting same, and winding means positioned diametrally in each button for varying the effective length of said flexible member; said winding means comprising a rotatable axle having a slot at one end thereof; a roller surrounding said axle and having a notch cut therein; a coil-spring placed intermediate said axle and roller; extensions positioned at both ends of the spring adapted respectively to engage said slot and notch; holding means positioned on said axle for rotating same for the purpose of adjusting the tension in said coil-spring; means for securing said flexible member to said roller, and means for locking said coil-spring into adjusted position.

4. In a cuff-link, a pair of cuff-buttons comprising each a box-member and a cap therefor; a flexible member for connecting said buttons, and winding means positioned diametrally in each button for varying the effective length of said flexible member; said winding means comprising a rotatable axle having a slot at one end and an angularly disposed lock-arm at the other end; a roller surrounding the shank of said axle and having a notch cut therein; a coil-spring placed intermediate said axle and roller; extensions positioned at both ends of the spring and adapted respectively to engage said slot and notch whereby the tension in the coil-spring may be adjusted; means for securing said flexible member to said roller; said box-member having a depression in one side adapted to be engaged by said lock-arm for the purpose of locking said coil-spring into adjusted position.

5. In a cuff-link, a pair of cuff-buttons comprising each a box-member and a cap therefor; a flexible member for connecting said buttons, and winding means positioned diametrally in each button for varying the effective length of said flexible member; said winding means comprising a rotatable axle having a slot at one end and an angularly disposed lock-arm at the other end; a roller surrounding the shank of said axle and having a notch cut therein; a coil-spring placed intermediate said axle and roller; extensions positioned at both ends of the spring and adapted respectively to engage said slot and notch whereby the tension in the coil-spring may be adjusted, said roller having a longitudinal slot for securing therein one end of said flexible member, and said box-member having a depression in one side thereof for receiving said lock-arm for the purpose of locking said coil-spring into adjusted position.

In testimony whereof I affix my signature.

CHARLES W. HEASLEY.